Figure 3:
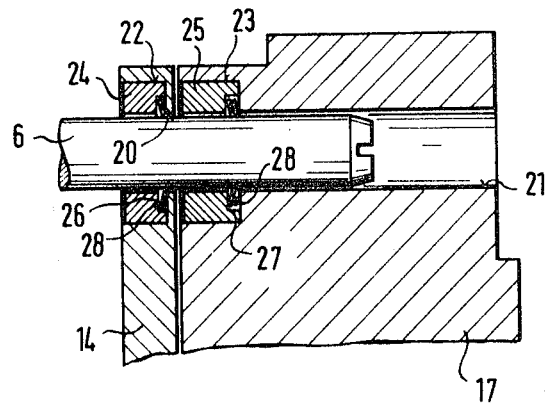

United States Patent
Wendler

[15] 3,665,231
[45] May 23, 1972

[54] AUTOMATICALLY ADJUSTABLE SINGLE DISC BRAKE FOR MOTORS

[72] Inventor: Guenther Wendler, Schwarzenbach, Saale, Germany

[73] Assignee: Adam Baumueller GmbH Fabrik Fur Elektrotechnik, Marktredwitz, Germany

[22] Filed: Mar. 18, 1970

[21] Appl. No.: 20,617

[30] Foreign Application Priority Data

Mar. 21, 1969 Germany..................P 19 14 469.5

[52] U.S. Cl..................................310/77, 188/171, 188/216
[51] Int. Cl. .......................................................H02k 7/102
[58] Field of Search...................310/77, 76, 92, 93, 94, 103; 188/171, 216; 192/144

[56] References Cited

UNITED STATES PATENTS

| | | | |
|---|---|---|---|
| 782,206 | 2/1905 | D'Olier | 310/77 X |
| 2,059,028 | 10/1936 | Price | 188/171 |
| 2,368,317 | 1/1945 | Meyer et al. | 188/171 |
| 2,462,017 | 2/1949 | Willits | 310/77 |
| 3,038,559 | 6/1962 | Hirzel | 188/216 X |
| 3,068,975 | 12/1962 | Theuer | 310/77 X |
| 3,139,160 | 6/1964 | Hink et al. | 188/171 |
| 3,357,528 | 12/1967 | Verlinde | 188/171 |
| 2,983,339 | 5/1961 | Neff | 188/171 |

*Primary Examiner*—J. D. Miller
*Assistant Examiner*—Mark O. Budd
*Attorney*—Richards & Geier

[57] ABSTRACT

A motor disc brake has a brake disc axially displaceable on the motor shaft, a displaceable armature disc which is normally in engagement with the brake disc and a displaceable magnet mounting element supporting an electromagnet which, when energized, moves the armature disc away from the brake disc to a limited extent and the mounting element towards the armature disc. Movement of the armature disc and mounting element away from the brake disc is limited by locking devices, so that the displaceable armature disc and the mounting element move towards the brake disc as the brake linings wear.

21 Claims, 6 Drawing Figures

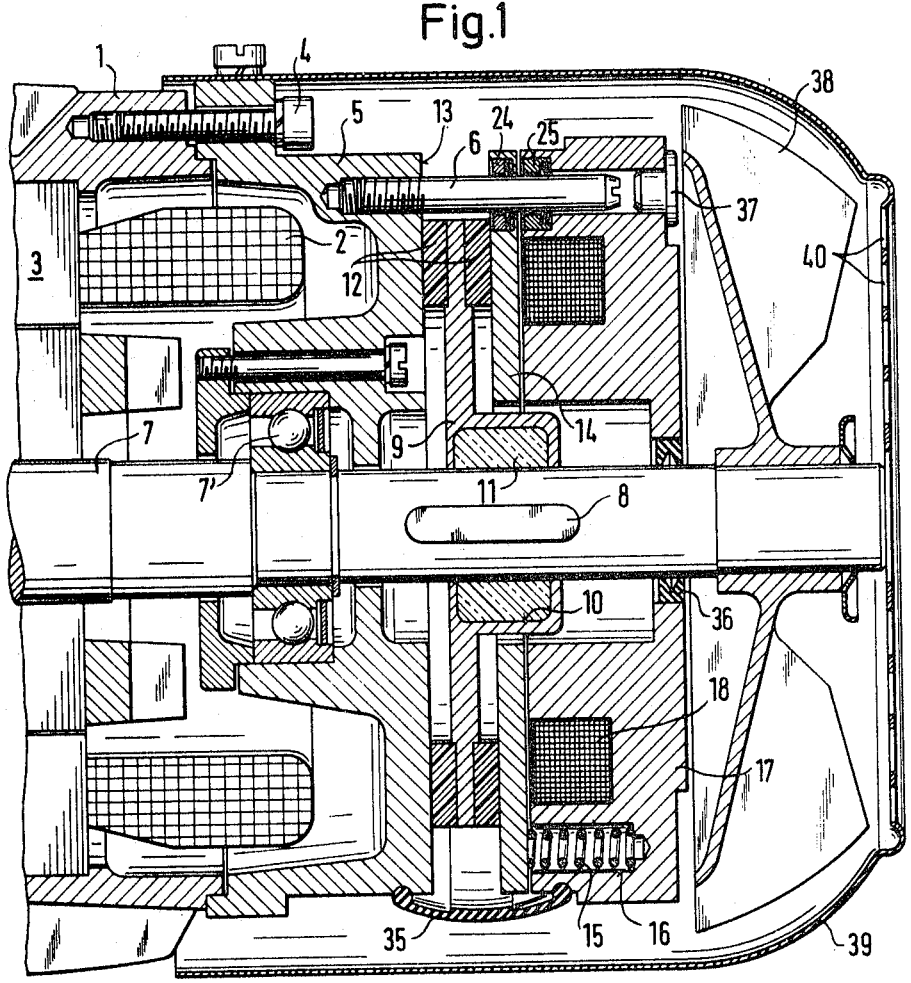
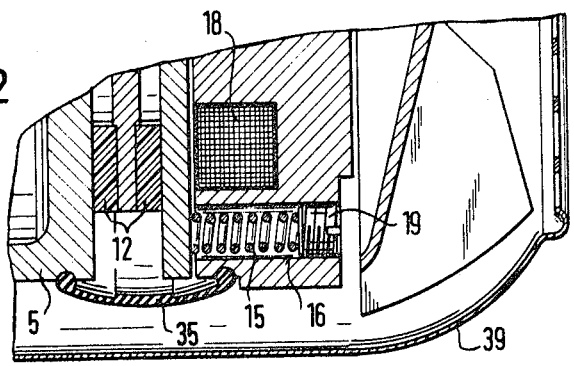

AUTOMATICALLY ADJUSTABLE SINGLE DISC BRAKE FOR MOTORS

The invention relates to a single-disc brake for motors, more especially electric motors.

Single disc brakes are known wherein a brake disc is arranged to be axially displaceable on the motor shaft and an armature disc is urged by spring force against the brake disc for braking and, for releasing the brake, is attracted against the force of the spring by a magnet member provided with a magnet winding.

In a known brake, as the brake linings wear the position of the magnet member has to be adjusted by unbolting the brake and removing bushes.

It is an object of the invention to provide a single disc brake which does not require this attention.

According to the present invention there is provided a disc brake for a motor, particularly an electric motor including a brake disc axially displaceable on the motor shaft, an axially displaceable armature disc spring urgeable into contact with the brake disc, and urgeable away from the brake disc by at least one electro-magnet supported in a magnet mounting element wherein the magnet mounting element is axially displaceable and movement of the armature disc and magnet mounting element away from the brake disc is limited by respective locking devices.

With the brake of this invention the magnet element and armature disc are always close together so that only a small magnetic force is needed to release the brake. An automatic adjustment is obtained as the brake linings on the brake disc wear because the armature disc and magnet element move towards the brake disc as the linings wear over a period of time.

In the effective position of the single-disc brake according to the invention, the armature disc is urged under spring force against the brake disc, so that the brake linings of the brake disc bear firstly on the non-rotatable armature disc and secondly on a corresponding surface brake of the motor housing. The magnet element cannot be displaced by the spring force in the direction away from the brake disc, since the said element is prevented from doing so by the locking device. As soon as the motor has started or has been switched on, the magnet element attracts the armature disc, and moves it slightly against the spring force, so that the brake is released. Should there be a relatively large clearance between the magnet element and the armature disc, because of wear on the brake linings, then the opposite force of attraction between the magnet element and the armature displaces said element in the direction of the said disc, since the locking device of the magnet element permits such a displacement. With this mutual attraction, the armature disc remains stationary, because of its locking device. By this mutual attraction, the effect of the spring force on the armature disc is removed and thus the brake is released. The single-disc brake according to the invention thus has the great advantage that it automatically reduces the clearance between the armature disc and the magnet element which occurs because of wear on the brake linings. Thus the maintenance of the single-disc brake is substantially simplified.

Since the air gap between the armature disc and the magnet element is always small, the magnetic force needed to release the brake is relatively small. For this reason, the magnet element and/or the armature disc can be made of ordinary cast iron.

The locking device may be of any type, for instance a ratchet brake, which prevents movement of the armature disc and of the magnet element in one direction.

It is also possible for the armature disc and the magnet element to be slidably arranged on bolts, which are fixed on the motor housing parallel to the motor shaft. In this case the armature disc and the magnet element have recesses surrounding the holes for the bolts. Plate springs are arranged in the recesses, they are clamped on the bolts and have a radial slots on the inside. These plate springs permit movement of the armature disc and the magnet element towards the brake disc and prevent such movement in the opposite direction. The springs can be located by annular insert pieces in spaces defined by sides of the recess and depressions in the insert pieces. During assembly the insert pieces are provided with the plate or dished springs in the depression and are pressed right into the recesses so that their end faces abut against the bases of the recesses.

The depressions in the insert pieces may be made of conical form, so that hardened steel balls can be arranged therein in addition to the dished springs. The balls can be forced by the springs against both the conical walls of the depression and the bolts.

If the armature disc and the magnet element have such recesses and annular insert pieces with conical depressions with hardened steel balls arranged therein, it is possible for the steel balls in the insert piece of the armature disc to be so arranged that a slight movement of that disc of, for example, 0.2 to 0.3 mm., away from the brake disc is possible, while the steel balls in the insert piece of the magnet element bear under the action of biased springs against the conical wall of the depression. With this arrangement, a movement of the magnet element in a direction towards the brake disc is also possible, but a movement in the reversed direction is excluded, because the steel balls, under the action of the biased springs, are pressed against the conical wall of the depression. A movement of the magnet element in a direction towards the brake disc only occurs when there is any wear on the brake linings. The magnet element is displaced in a direction towards the brake disc, with energization of its winding, by the distance corresponding to this wear. At the same time, the magnet element attracts the armature disc and moves this by about 0.2 to 0.3 mm. in a direction away from the brake disc, whereby a reliable release of the brake is guaranteed.

In order to simplify assembly, the steel balls can be arranged in ball cages which are disposed on the bolt. The conical wall of the depression can enclose an angle of about 8° with the central axis of the bolt, so that an extremely effective clamping action is produced. A shim can be arranged between each spring and the hardened steel balls.

The annular insert pieces consist of hardened steel or advantageously of hardened sintered metal. The depression in the annular insert pieces can be provided with a lubricant.

Compression springs can be arranged in the magnet element to act on the armature disc. Adjustable threaded bolts can be provided in the magnet element for spring force, with the compression springs being supported on said bolts. Such adjustment of the braking force can be effected very accurately, for the automatic adjustment of the inventive brake maintains this force constant when the linings are worn.

The brake disc may be arranged directly on the motor shaft and have a recess provided with oil or grease in its bore. The lubricant ensures sliding movement of the brake disc along the motor shaft. The recess can be made in any desired form, for example, as an annular groove, and can be filled by a ring of sintered metal to retain the lubricant.

Alternatively, it is possible to arrange the brake disc directly on the motor shaft and provide on each side of the brake disc an annular packing which tightly embraces the motor shaft and which has an elastic conical part which is forced against the brake disc. Even if the brake disc is displaced automatically in operation due to wear on the brake linings, both conical parts continue to contact the disc and sealing of the bearing of the disc on the shaft is maintained in an air-tight and moisture-proof manner even over long operational periods at extremely low temperatures.

For further simplifying the production, the brake disc may consist of an aluminum pressure casting. In the production of the brake disc with the ring consisting of sintered metal, first of all the ring of sintered metal is produced and fitted into a suitable mould and then the brake disc of an aluminum pressure casting is made.

Figure 4:
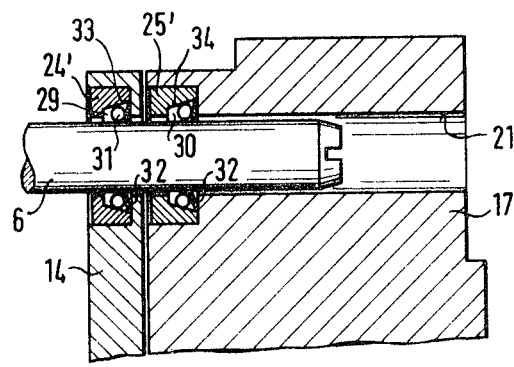
Figure 5:
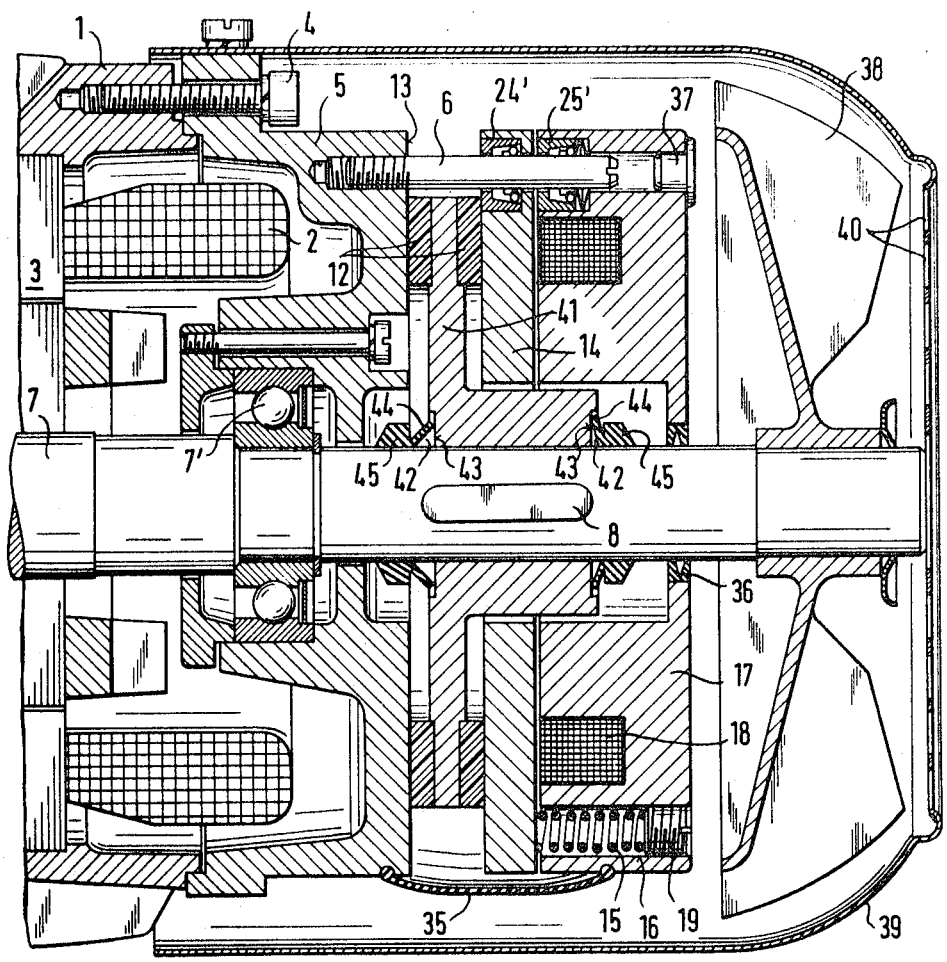
Figure 6:
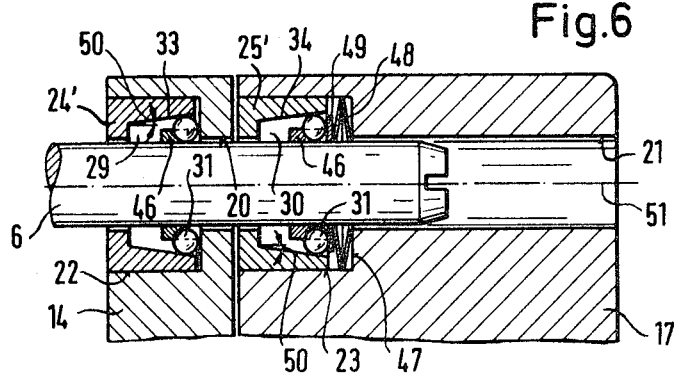

In order that the invention may be more clearly understood, the following description is given by way of example with reference to the accompanying drawings, in which:

FIG. 1 is an axial section through an electric motor with one form of built-in single-disc brake according to the invention, FIG. 2 shows a part of FIG. 1, the single-disc brake of FIG. 1 additionally provided with means for adjusting the braking force, FIG. 3 shows a part of FIG. 1 to a larger scale, FIG. 4 shows the same part as in FIG. 3, in which steel balls are provided in addition to the dished springs, FIG. 5 is an axial section similar to FIG. 1, showing another form of single-disc brake according to the invention, and FIG. 6 shows a part of FIG. 5 on a larger scale.

The electric motor comprises a housing 1, in which is arranged a stack of stator laminations 3 provided with a stator winding 2. Fixed on the housing 1 by means of bolts 4 is a mounting plate 5, from which bolts 6 screwed thereinto project parallel to the motor shaft 7. Disposed in a suitable recess in the mounting plate 5 is a ball bearing 7' for the mounting of the motor shaft 7, which comprises a recess for accommodating an adjusting spring 8. By means of this adjusting spring 8, a brake disc 9 consisting of aluminum pressure casting is arranged on the motor shaft 7. The hub of the brake disc 9 comprises an annular groove 10, which is filled by a ring 11 of sintered metal, this ring being saturated with oil or grease. Brake linings 12 are fixed on the outer marginal portion of the brake disc 9 and on both sides thereof. In the braking position as shown, one brake lining 12 bears on the face of the mounting plate 5 and the other brake lining 12 on an armature disc 14, which is forced against the right-hand brake lining 12 according to FIG. 1 by compression springs 15, which are arranged in recesses 16 of a magnet element 17. The magnet element 17 is provided with a magnet winding 18, which is supplied with current on switching on the electric motor. The braking force is determined by the compression springs 15. Serving to adjust the braking force are threaded bolts 19 (FIG. 2) which are screwthreaded into suitable threaded holes in the magnet element 17 and against which the compression springs 15 bear.

Both the armature disc 14 and the magnet elements 17 comprise holes 20 and 21 which are in alignment with one another and arranged around their periphery, said holes having fitted thereinto the bolts 6 on which the armature disc 14 and the magnet element 17 are displaceably mounted. Furthermore, the armature disc 14 and the magnet element 17 are provided in the region of the holes 20 and 21 with recesses 22 and 23, into which are pressed the insert pieces 24 and 25 in such a way that, according to FIG. 3, their outer annular surface is disposed beneath the corresponding face of the armature disc 14 and magnet element 17. The insert pieces 24 and 25 have on their inner faces depressions 26 and 27 into which are fitted dished springs 28 comprising on the inside radial slots, whereby resilient tongues are formed which spring against the bolts 6. As shown in FIG. 3, one dished spring 28 is provided in the depression 26 and two dished springs 28 in the depression 27. These dished springs 28 make possible a movement of the armature disc 14 and magnet element 17 towards the left according to FIGS. 1 and 3, while they prevent any movement of the disc 14 and magnet element 17 towards the right, because the tongues are more strongly urged towards the bolts when movement to the right is attempted.

In the operative position of the single-disc brake, as shown in FIG. 1, the compression springs 15 bear against the armature disc 14. At their other ends the compression springs 15 bear against the bottom of the recesses 16 in the magnet element 17. The dished springs 28 prevent a displacement of the magnet element 17 under the action of the compression springs 15 towards the right, which cause the dished springs 28 to clamp the bolts 6 more firmly.

If current is supplied to the magnet winding 18 when the motor is switched on, then a mutual force of attraction is set up between the magnet element 17 and the armature disc 14. This overcomes the force of the compression springs 15 and the single-disc brake is released, so that the motor shaft 7 can be rotated with the brake disc 9. Because the dished spring 28 in the depression 26 prevents movement of the armature disc 14 towards the right as seen in FIGS. 1 and 3, the magnet element 17 is drawn by the mutual force of attraction towards the armature disc 14. As a result, any clearance between the armature disc 14 and the magnet element 17, due to wear on the brake linings 12, is reduced. In this way, after any wear on the brake linings 12, there is obtained an automatic adjustment of the single-disc brake. Once the braking force is set by adjusting springs 15 it is always maintained.

Since the air gap between the armature disc 14 and the magnet element 17 is extremely small, a small magnetic force is sufficient to release the single-disc brake. As a consequence, the magnet element 17 and/or the armature disc 14 can consist of ordinary cast iron.

As shown in FIG. 4, the insert pieces 24' and 25', consisting of hardened steel or hardened sintered metal, which are arranged in the armature disc 14 and the magnet element 17, are provided with conical depressions 29 and 30, in which hardened steel balls 31 and dished springs 32 are so arranged that the dished springs 32 force the steel balls 31 against the conical walls 33 and 34 of the depressions 29 and 30 and also against the bolt 6. The dished springs are so constructed that their inner rims do not contact the bolt 6 even when they are pressed flat. The hardened steel balls 31, provide clamps between the bolt 6 and the conical walls 33 and 34 when a force directed towards the right as regards FIG. 4 is exerted on the armature disc 14 or the magnet element 17. As a consequence, any movement of the armature disc 14 and of the magnet element 17 towards the right is prevented, while a movement towards the left is possible.

Externally, the single-disc brake can be sealed off by means of packings 35 and 36 and plugs 37.

The right-hand end of the motor shaft 7 is provided with a fan 38, which is covered, together with the single-disc brake, by a cover hood 39, which is fixed on the mounting plate 5 and which has openings 40 in the vicinity of the fan 38.

As shown in FIG. 5, the brake disc 41 is again displaceably mounted directly on the motor shaft 7. On the two opposite faces, the brake disc 41 has recesses 42, on the smooth sides 43 of which elastic conical lugs or tongues 44 on ring packings 45, bear. These tightly enclose the motor shaft 7. In this arrangement, the conical tongue 44 of the right-hand ring packing 45 is initially more tightly engaged than is the conical tongue 44 of the left-hand ring packing 45, because in operation with the wear on the brake linings 12, the brake disc 41 is displaced towards the left according to FIG. 5 while the packings remain stationary. The two ring packings 45 produce a satisfactory sealing of the bearing position of the brake disc 41 on the motor shaft 7, so that no moisture or moist air can reach the bearing position, whereby any seizing or binding of the brake disc 41 on the motor shaft 7 is prevented, even at extremely low temperatures. Like the brake disc 9, the brake disc 41 can also consist of aluminum pressure castings.

Referring to the constructional example shown in FIGS. 5 and 6, the armature disc 14 and the magnet element 17 include recesses 22 and 23, into which are pressed annular insert pieces 24' and 25' consisting of hardened steel or hardened sintered metal, said pieces having conical depressions 29 and 30. Disposed inside the conical depressions 29 and 30 are hardened steel balls 31, which are arranged in ball cages 46 fixed on the bolt 6. The left-hand ball cage 46 according to FIG. 6 and the associated steel balls 31 are so arranged that the balls have some room for movement, and when the magnet winding 18 is energized, the armature disc 14 is moved towards the right according to FIG. 6 by about 0.2 to 0.3 mm., whereby a satisfactory release of the brake is obtained. Two dished springs 48 and a shim 49 are disposed between the bottom 47 of the recess 23 in the magnet element and the steel balls 31. The pretensioned dished springs 48, by means of the shim 49, force the steel balls 31 against the conical wall 34 and against the bolt 6.

When the magnet winding 18 is energized, the magnet element 17 and the armature disc 14 are mutually attracted so that a movement of the armature disc 14 towards the right in FIG. 6 by about 0.2 to 0.3 mm. occurs. A movement of the magnet element 17 towards the left in FIG. 6 only occurs when extra clearance is produced by the wear on the brake linings 12. Because the dished springs 48 urge against the shim 49 to force the steel balls 31 against the conical wall 34 and the bolt 6, no movement of the magnet element 17 towards the right in FIG. 6, can occur.

The angle 50 which the conical walls 33,34 form with the mean axis 51 of the bolt 6 is about 8°.

The embodiment of the single-disc brake shown in FIGS. 5 and 6 is especially suitable for electric motors which are subjected to large vibrations.

We claim:

1. A disc brake for an electric motor having a shaft and a housing, said brake being located within said housing and comprising a brake disc axially displaceable on said shaft, a displaceable armature disc, spring means urging said armature disc to contact said brake disc, a displaceable magnet mounting element, at least one electro-magnet supported by said mounting element and urging said armature disc away from said brake disc, locking devices limiting the movement of said armature disc and said mounting element away from said brake disc, bolts fixed to said housing and slidably supporting said armature disc and said mounting element, means defining recesses surrounding said bolts in said armature disc and said mounting element, insert portions inserted in said recesses, and means defining depressions in said insert portions, said locking devices being accomodated in said depressions, said depressions having sides of conical shape widening in a direction away from said brake disc, said locking devices comprising steel balls located in said depressions and adapted to be wedged between said sides and said bolts.

2. A disc brake as claimed in claim 1, further comprising ball cages to hold said balls in said depressions.

3. A disc brake as claimed in claim 1, wherein the angle of the cone is 16 degrees.

4. A disc brake as claimed in claim 1, wherein the balls are urged to the wedging position by dished plate springs.

5. A disc brake as claimed in claim 1, wherein said balls are loosely retained in said depression in said armature disc/to allow movement of said armature disc away from said brake disc of 0.2 to 0.3 mm. before wedging.

6. A disc brake for an electric motor having a housing and a shaft, a brake disc mounted upon said shaft and axially movable thereon but rotatably solely with said shaft, an armature disc movably guided in said casing in the axial direction of said shaft, at least one spring pressing said armature disc against said brake disc for braking and raising it from said brake disc for airing the brake, a magnet element having a magnet winding and movable in said housing in the axial direction of said shaft, said magnet element being adapted when excited to attract said armature disc against the action of said spring, locking means connected with said armature disc and permitting the axial movement of said armature disc in the direction toward said brake disc under the action of said spring but preventing the movement of said armature disc toward said magnet element urged by the force of attraction of the excited magnet element and locking means connected with said magnet element and permitting the axial movement of said magnet element in the direction toward said armature disc by the force of attraction exerted upon said armature disc but preventing the movement of said magnet element in the opposite direction.

7. A brake in accordance with claim 6, comprising bolts fixed to said housing and extending parallel to said shaft, said armature disc and said magnet element being mounted upon said bolts and axially movable thereon, said armature disc and said magnet element having recesses adjacent the holes for the bolts, and innerly radially slotted dished springs located in said recesses and clamped upon said bolts.

8. A brake in accordance with claim 7, comprising an annular insert piece inserted in one of said recesses and having upon its inner surface which engages the bottom of the recess a depression for one of said dished springs.

9. A brake in accordance with claim 8, wherein said annular insert piece has a depression conically outwardly extending in said insert place, and hardened steel balls located in said insert piece beside said dished spring, said balls pressed against the conical wall of said depression and said bolt by said dished spring which is tensioned and encloses said bolt.

10. A brake in accordance with claim 6, having a bolt fixed to said housing parallel to said shaft, said armature disc and said magnet element being mounted upon said bolt, said armature disc and said magnet element having recesses close to their holes for the bolt, a separate annular insert mounted in each recess, said insert having an inner outwardly enlarging depression, hardened steel balls located in said depression, said steel balls permitting a short movement of said armature disc away from said brake disc, and springs pressing said steel balls against a conical wall of said depression.

11. A brake in accordance with claim 10, comprising a ball cage mounted upon said bolt and containing said steel balls.

12. A brake in accordance with claim 10, wherein the conical wall of said depression forms an angle of substantially 8° with the central axis of said bolt.

13. A brake in accordance with claim 10, wherein said springs are plate springs, a shim plate being located between said springs and said steel balls.

14. A brake in accordance with claim 9, wherein the insert portions consist of hardened steel.

15. A brake in accordance with claim 9, wherein the insert portions consist of hardened sintered metal.

16. A brake in accordance with claim 9, wherein the depression in the insert portions is provided with a lubricant.

17. A brake in accordance with claim 6, wherein said brake disc is arranged directly on said motor shaft and has a recess provided with a lubricant in its bore.

18. A brake in accordance with claim 17, further comprising an annular ring of sintered metal surrounding said motor shaft, and a recess in said brake disc accommodating said annular ring.

19. A brake in accordance with claim 6, wherein said brake disc is mounted directly upon said motor shaft, said brake having annular packings tightly enclosing said motor shaft on opposite sides of said brake disc, said packings having an elastic tensioned conical tongue tightly engaging said brake disc.

20. A brake in accordance with claim 6, wherein said brake disc consists of pressure cast aluminum.

21. A brake in accordance with claim 6, wherein at least one of said armature discs and said magnet mounting element consist of cast iron.

* * * * *